United States Patent [19]

Pfefferkorn

[11] Patent Number: 4,919,116

[45] Date of Patent: Apr. 24, 1990

[54] GAS BURNER ELEMENT WITH UNIVERSAL SUPPORTS

[75] Inventor: Earle L. Pfefferkorn, Racine, Wis.

[73] Assignee: Greene Manufacturing Co., Racine, Wis.

[21] Appl. No.: 352,834

[22] Filed: May 15, 1989

[51] Int. Cl.$^5$ .............................................. F24C 3/00
[52] U.S. Cl. ............................ 126/41 R; 126/39 R; 126/39 C
[58] Field of Search ............... 126/41 R, 25 R, 52, 126/39 H, 39 C, 39 R; 99/339; 431/278; 403/299, 229, 343, 166, 118

[56] References Cited

U.S. PATENT DOCUMENTS

| | | | |
|---|---|---|---|
| 2,542,577 | 2/1951 | Russell | 126/39 H |
| 4,267,816 | 5/1981 | Koziol | 126/41 R |
| 4,462,384 | 7/1984 | Hitch | 126/41 R |
| 4,478,205 | 10/1984 | Koziol | 126/25 R |
| 4,773,384 | 9/1988 | Koziol | 126/41 R |
| 4,790,208 | 12/1988 | Johnson | 403/299 X |

Primary Examiner—Larry Jones
Attorney, Agent, or Firm—Peter N. Jansson

[57] ABSTRACT

A gas burner element includes a diffusion chamber and a plurality of burner arms extending from the chamber, the chamber and the arms having a plurality of holes for flowing gas therethrough. A support member is received in the underside of each of the arms for adjustably mounting the element in a spaced relationship from a burner kettle and for maintaining the relationship when mounting is complete. Each support member includes an upper, generally vertical shaft threadably engaged to its associated arm and a lower foot portion disposed radially to the shaft. The spaced relationship between the burner kettle and the burner element are adjustable by rotating the support member in one direction or another, thereby extending or retracting a support member with respect to its related burner arm.

9 Claims, 2 Drawing Sheets

GAS BURNER ELEMENT WITH UNIVERSAL SUPPORTS

FIELD OF THE INVENTION

This invention is related generally to burner elements for gas grills and, more particularly, to a gas burner element having support members constructed and arranged to properly support the burner element within any one of a wide variety of burner kettle configurations.

BACKGROUND OF THE INVENTION

Gas grills such as may be used for the barbecue of food usually include a gas burner element and a receiving kettle which are made by different manufacturers, sometimes with little or no effort to coordinate the compatibility of those two main components. It has been estimated that there are over 200 different burner kettle configurations, each of which may require a slightly different adaptation of the gas burner element to be mounted therewithin. The frequent result is that the manufacturer of the gas burner element must often furnish features permitting the mounting of that element in any one of several burner kettles so that the top surface of the element is generally parallel and in the proper spaced relationship to the grate upon which food is prepared.

An example of such a burner element is shown and described in U.S. Pat. No. 4,267,816. The described burner element includes leg members which are pivotally and extendably attached to the burner element. Each leg member and its associated structure includes three separate pieces, i.e. a leg member supported and secured in position by a relatively expensive support tube and accompanying set screw. Therefore, a total of 12 separate pieces is required to support a burner having the illustrated configuration. In addition, changes in the spacing relationship between the burner element and the underlying kettle floor necessarily requires that the leg member contact the floor at a different point for each selected spacing. While this configuration provides easy, repetitive adjustment, it fails to appreciate that once a burner element is mounted within a particular kettle, the need for subsequent adjustment is virtually eliminated.

There is a need for gas burner elements which use a minimum number of pieces to construct a support element and in particular, there is a need for a burner element which permits selection of a consistent contact surface upon the burner kettle, notwithstanding adjustments in the spaced relationships between the burner element and the floor of the burner kettle. Such a burner element which also includes means for securing the support member and the burner element to one another without human intervention would be a distinct advance in the art.

OBJECTS OF THE INVENTION

An object of this invention is to overcome some of he shortcomings and problems of the prior art.

Another object of this invention is to provide a gas burner element which permits coincidence of point of contact with the floor of a burner kettle, notwithstanding an adjustment in the spaced relationship between the element and the kettle floor.

Still another object of this invention is to provide a gas burner element whereby the body member and the support member becomes secured to one another in use without human intervention and for the purpose of maintaining the selected relationship between the element and the kettle floor.

Yet another object of the invention is to provide support for the element body while yet minimizing the number of parts necessary for the purpose.

How these and other objects are accomplished will be apparent from the description of the preferred embodiments of the invention taken in conjunction with the accompanying drawing.

SUMMARY OF THE INVENTION

A gas burner element includes a diffusion chamber and a plurality of burner arms extending from the chamber, the chamber and the arms having a plurality of holes for flowing gas therethrough. A support member is received in the underside of each of the arms for adjustably mounting the element in a spaced relationship from a burner kettle and for maintaining the relationship when mounting is complete. Each support member includes an upper, generally vertical shaft threadably engaged to its associated arm and a lower foot portion disposed radially to the shaft. The spaced relationship between the burner kettle and the burner element are adjustable by rotating the support member in one direction or another, thereby extending or retracting a support member with respect to its related burner arm.

In a preferred embodiment, the support member defines a generally L-shaped structure formed of a metal dissimilar to that used to form the element. The proper selection of dissimilar metals will permit oxidation bonding at the region of threaded engagement of the support member and the arm, thereby maintaining the adjusted spaced relationship between the element, the kettle floor and the grate which forms the cooking surface. Rotation of the vertical shaft of the support member will extend or retract it with respect to its associated burner arm and it will be observed that by proper radial positioning of the foot portion, one may select a consistent contact surface of the burner kettle floor upon which the element will be supported, notwithstanding incremental adjustments in the spacing between the element and the floor. In a preferred embodiment, the support member is formed as a unitary structure and when so configured, results in a support structure having a minimum number of parts, four in the illustrated embodiment.

DETAILED DESCRIPTION OF THE PREFERRED EMBODIMENTS

The figures illustrate a gas burner element 10 with universal support member 11 for adapting the element 10 to any one of a wide variety of burner kettle configurations.

Figure 1:
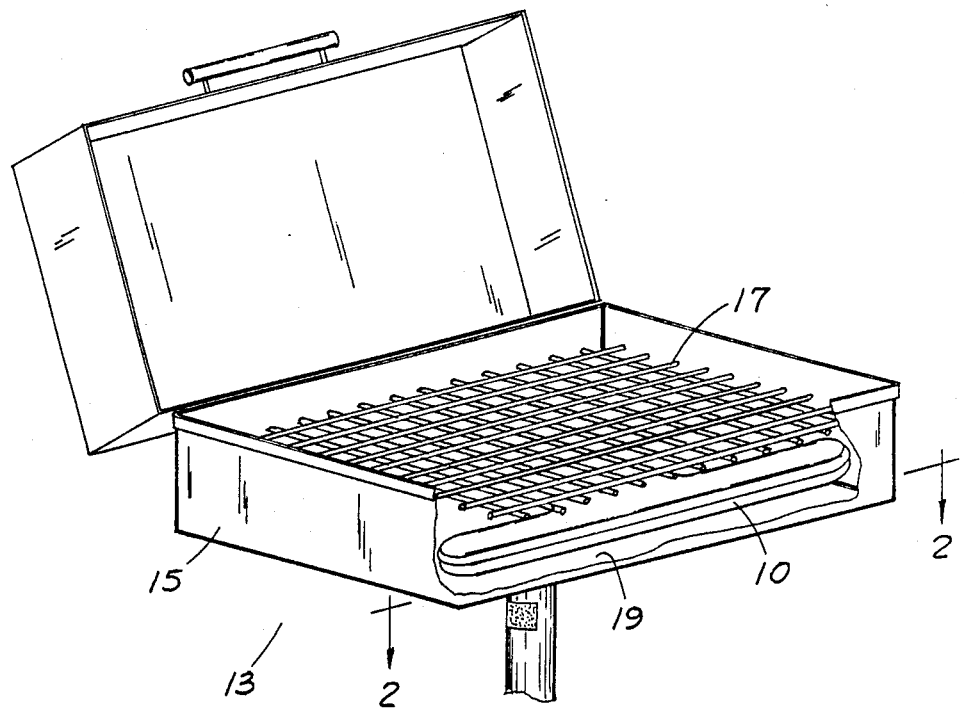
FIG. 1 is a perspective view of a gas grill assembly containing the burner element of the invention.
Figure 2:
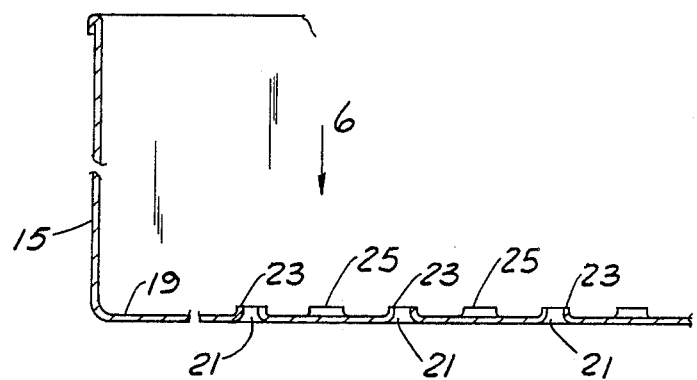
FIG. 2 is a cross sectional elevation view of the burner kettle taken normal to the plane 2—2 of FIG. 1.

Referring first to FIGS. 1 and 2, there is shown a gas grill 13 having a burner kettle 15, a grate 17 disposed within the kettle and a gas burner element 10 supported in a spaced relationship intermediate the grate 17 and the floor 15 of the burner kettle 14. Kettles in which the inventive burner element 10 may be used are frequently formed of a cast material such as iron or aluminum and in the floor 19 thereof include a plurality of holes or slots 21 which permit the entry of air to support combustion. In order to prevent the leakage of grease which results from the cooking of fatty foods, the holes or slots 21 are formed to include a shoulder 23 for preventing such leakage to the exterior. The presence of these shoulders 23 and the wide variety of sizes and patterns in which holes or slots 21 are formed by grill manufacturers presents an often unpredictable kettle floor 19 upon which a gas burner element 10 is to be supported. Ridges 25 may also be intentionally cast into the floor 19 or may merely result from inaccuracies in the casting process. As will become apparent from the following description, the inventive gas burner element 10 uniquely overcomes these problems.

Figure 3:
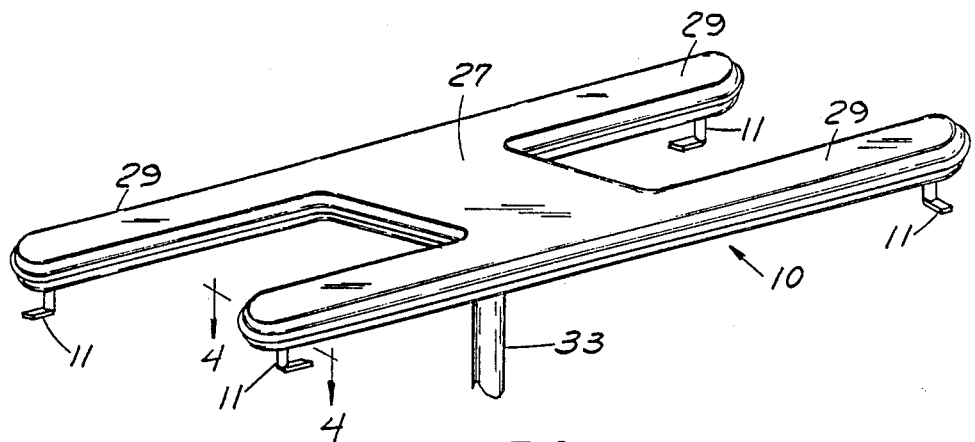
FIG. 3 is a perspective view of the inventive burner element with universal supports.

Referring next to FIG. 3, the gas burner element 10 may be formed of sheet metal to define a main diffusion chamber 27 and a plurality of burner arms 29 extending from the chamber 27. The arms 25 and the chamber 27 include a plurality of holes 31 for permitting gas to flow from the inlet pipe 33, through the chamber 27 and the arms 25 and through the holes 31 to carry out the combustion process. A support member 11 is received in the undersurface of each of the arms 29 for maintaining the element 10 in an adjustable, spaced relationship from the floor 15 of the burner kettle 15.

Figure 4:
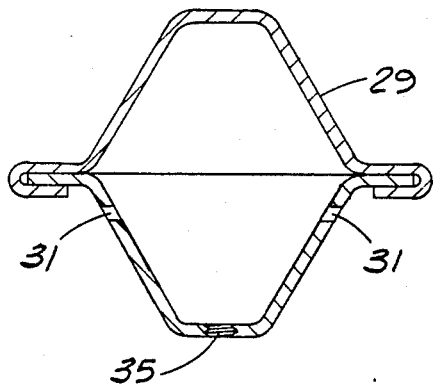
FIG. 4 is a cross sectional elevation view of a burner arm taken normal to the plane 4—4 of FIG. 3.

Referring next to FIG. 4 each arm 29 includes a drilled and tapped aperture 35 for receiving a support member 11 and in the illustrated embodiment, each arm 29 receives but a single support member 11.

Figure 5A:
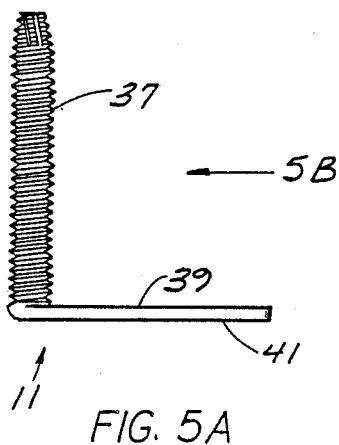
FIG. 5A is a side elevation view of a support member.
Figure 5B:
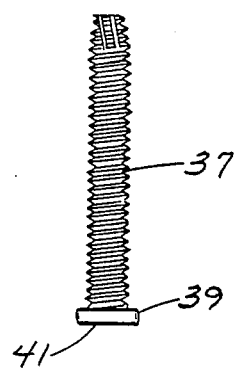
FIG. 5B is an end elevation view of the support member of FIG. 5A taken along the axis of 5B.

Referring next to FIGS. 5A and 5B, the support member 11 is shown to include a generally vertical shaft 37 threaded to be received in the aperture 35 of each arm 29 with a slight snug fit to prevent inadvertent positional movement of the support member 11 with respect to the arm 29 while yet permitting relatively easy turning of the vertical shaft for adjustment purposes. A foot portion 39 is disposed radially to the shaft 37 and in the preferred embodiment, includes a generally flat pad 41.

Figure 6:
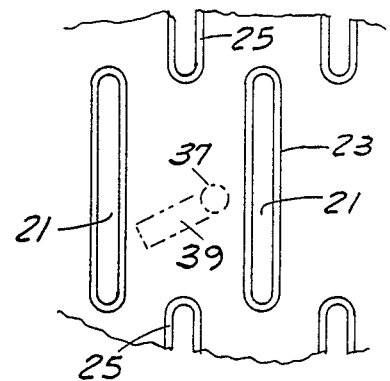
FIG. 6 is a a top plan view of a portion of the floor of the kettle of FIG. 2 taken along the axis 6, with parts broken away, illustrating air slots and ridges formed in the floor and with an arm and a support member shown in phantom.

Referring to FIG. 6, it is to be appreciated that when the shaft 37 of the support member 11 is threadably engaged to the aperture 35 in an arm 25, the support member 11 may be extended or retracted by merely rotating it in one direction or the other. It is also to be appreciated that with each 360 degree rotation of the vertical shaft 37, the radially-disposed foot portion 39 may be made to rest upon a consistent contact surface of the kettle floor 19, as, for example, the contact surface immediately beneath the foot portion shown in phantom in FIG. 6. This is so notwithstanding that rotation of the vertical shaft 37 has resulted in incremental adjustment in the spaced relationship between the burner element 10 and the kettle 15. This is highly advantageous since by selecting the optimum radial position of the foot portion 39, the assembler may position the foot portion 39 upon that contact surface of the burner kettle floor 19 which is best suited for support as, for example, an area which is devoid of ridges 25. Having selected the optimum contact surface, the assembler may also adjust the height of the burner element 10 while still using the same contact surface.

It is also to be appreciated that each support member 11 is individually, rotatably adjustable within its respective arm 25 so as to arrange the burner element 10 in a generally parallel relationship to the grate 17, notwithstanding that the floor 19 of the kettle 15 may be uneven and notwithstanding that one or more foot portions 39 may unavoidably be required to be placed upon a ridge 25. The construction of the burner element 10 also helps eliminate undesirable lateral relocation of the element 10 in an effort to avoid obstructions on the kettle floor 19.

The features and benefits of the inventive burner element 10 are important primarily in the first assembly of the kettle 15, burner element 10, grate 17 and other components to form the completed, new grill 13. Such features and benefits are also of value if the user of the grill 13 should have to replace the burner element 10. However, once the burner element 10 is satisfactorily mounted, it is preferred that the adjusted mounting position resist being disturbed over long periods of use. While prior burner elements have used set screws or the like to maintain burner adjustment, such set screws may become inadvertently loosened, and in addition, such a configuration requires an unnecessary number of parts.

In the inventive element, the phenomenon of metal oxidation is used to positionably secure the support member 11 within the arm 29. To that end, the burner element 10 may be formed of a first metal and the support member 11 is formed of a second, dissimilar metal, the metals being selected to permit oxidation bonding at the region of threaded exgagement of the support member 11 and its related arm 29. In the preferred embodiment, the first metal is aluminum-coated steel or stainless steel and the second metal is low carbon steel.

Oxidation rapidly occurs when the grill 13 is being used since the support member 11 is at a temperature lower than that of the arm 29 and moisture collects thereon, resulting in oxidation. The oxidation process is accelerated by virtue of the elevated temperatures at which the burner element 10 operates.

The foregoing describes a unique gas burner element 10 with universal support members 11 which, in a burner element 10 having four arms 29 as illustrated, the total number of parts to provide support is four and unnecessary cost is thereby avoided. Each of the foot portions 39 is independently, radially positionable to permit the element 10 to be supported upon the optimum contact surface of the kettle floor 19 and this same point or area may be utilized, notwithstanding incremental adjustments with height. Because the element 10 and the support member 11 are selected to be made of dissimilar materials to promote rapid oxidation at the point of their threaded engagement, the finally-adjusted position is rather quickly assured without the use of additional parts such as set screws or the like.

While the principles of this invention have been described in connection with specific embodiments, it should be understood clearly that these descriptions are made only by way of example and are not intended to limit the scope of the invention.

What is claimed:

1. A gas burner element adapted for mounting within a burner kettle having spaced holes formed in the floor thereof, the element including: a body member defining a diffusion chamber and a plurality of burner arms extending from said chamber, said arms having a plurality of holes for flowing gas therethrough; a support member received in each of said arms for maintaining said element in an adjustable, spaced relationship from a burner kettle, said support member including a generally vertical shaft threadably engaged to said arm and a foot portion disposed radially to said shaft, said foot portion having a width and a length substantially greater than said width, said burner element thereby being adapted to be adjustably supportable in areas of the kettle floor which are devoid of holes, irrespective of the height at which the burner element is supported, said relationship between said burner kettle and said burner element being adjustable by rotating said vertical shaft, thereby extending or retracting said support member with respect to tis related burner arm.

2. The element of claim 1 wherein said foot portion may be made to rest upon a consistent contact surface on the floor of said burner kettle, notwithstanding an adjustment in said spaced relationship between said element and said kettle.

3. The element of claim 2, wherein said foot includes a generally planar pad for contacting said burner kettle and supporting said element thereon.

4. A gas burner element adapted for mounting within a burner kettle having a floor surface and including:
    a diffusion chamber and a plurality of hollow burner arms extending from said chamber in gas flowing relationship thereto, said arms having holes for flowing gas therethrough, said chamber and said arms being formed of a first metal;
    each of said arms having a support member projecting therefrom for supporting said element in a spaced relationship from a burner kettle;
    each said support member being generally L-shaped and having a shaft for threaded engagement with an aperture in one of said arms and a foot portion for supportably contacting a floor surface of said burner kettle;
    said support members being formed of a second metal, said first metal and said second metal being selected to permit oxidation bonding at the region of threaded engagement of a said support member and a said arm, thereby maintaining said spaced relationship between said element and said kettle.

5. The element of claim 4 wherein said second metal is low carbon steel.

6. The element of claim 5 wherein said first metal is aluminum-coated steel.

7. The element of claim 5 wherein said first metal is stainless steel.

8. A gas burner element adapted to be supported within a generally-surrounding burner kettle having a grate and a floor, the element including:
    a hollow gas diffusion chamber;
    a plurality of hollow burner arms extending from said chamber, each arm havingholes for permitting gas to flow therethrough from said chamber and through said arms; each of said arms including a threaded aperture on the underside thereof for receiving an adjustable support member;
    a plurality of generally L-shaped support members, each support member having a generally horizontal foot portion, each support member being in threaded adjustable engagement with a said aperture of one of said arms, thereby adapting said burner element, to be supported in a spaced relationship from the burner kettle and generally parallel to the grate;
    the position of each foot portion being radially adjustable to permit selection of a different contact surface upon the kettle floor for each rotational increment of adjustment of the support member so long as the total rotational adjustment is less than 360°.

9. The element of claim 8 wherein each support member is formed as a one-piece structure.

* * * * *